United States Patent
Okada

(10) Patent No.: US 10,857,746 B2
(45) Date of Patent: Dec. 8, 2020

(54) METHOD OF MANUFACTURING OPTICAL FIBER, OPTICAL FIBER MANUFACTURING APPARATUS, AND CONTROL APPARATUS THEREFOR

(71) Applicant: FUJIKURA LTD., Tokyo (JP)

(72) Inventor: Kenji Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 30 days.

(21) Appl. No.: 16/004,914

(22) Filed: Jun. 11, 2018

(65) Prior Publication Data

US 2018/0290409 A1 Oct. 11, 2018

Related U.S. Application Data

(62) Division of application No. 15/017,813, filed on Feb. 8, 2016, now Pat. No. 10,016,951.

(30) Foreign Application Priority Data

Feb. 10, 2015 (JP) .................. 2015-024688

(51) Int. Cl.
| | |
|---|---|
| C03B 37/03 | (2006.01) |
| C03B 37/025 | (2006.01) |
| B29D 11/00 | (2006.01) |
| B29K 105/00 | (2006.01) |
| B29L 11/00 | (2006.01) |

(52) U.S. Cl.
CPC .... B29D 11/00721 (2013.01); C03B 37/0253 (2013.01); C03B 37/032 (2013.01); B29K 2105/253 (2013.01); B29L 2011/0075 (2013.01); Y02P 40/57 (2015.11)

(58) Field of Classification Search
CPC .......................... C03B 37/025–0256
See application file for complete search history.

(56) References Cited

U.S. PATENT DOCUMENTS

| | | | |
|---|---|---|---|
| 8,074,474 B2 | 12/2011 | Filippov et al. | |
| 2003/0000255 A1 | 1/2003 | Kohmura et al. | |

(Continued)

FOREIGN PATENT DOCUMENTS

| | | |
|---|---|---|
| CN | 100345782 C | 10/2007 |
| CN | 101541695 A | 9/2009 |

(Continued)

OTHER PUBLICATIONS

S.K. Singh, "Process Control Concepts, Dynamics and Applications", PHI Learning Private Limited, 2009, pp. 63-64 (total 4 pages).

(Continued)

*Primary Examiner* — Lisa L Herring
(74) *Attorney, Agent, or Firm* — Sughrue Mion, PLLC

(57) ABSTRACT

A method of manufacturing an optical fiber of the invention includes: preparing one or more direction changers; drawing the bare optical fiber from an optical fiber preform; providing a coated layer on a periphery of the bare optical fiber; obtaining an optical fiber by curing the coated layer; changing the direction of the bare optical fiber at the position between the bare-optical-fiber formation position and the coated-layer provision position; detecting the position of the bare optical fiber in at least one of the direction changers; and adjusting the introduction flow rate of the fluid into the direction changer based on positional information obtained by the detection.

10 Claims, 6 Drawing Sheets

(56) References Cited

U.S. PATENT DOCUMENTS

| | | |
|---|---|---|
| 2009/0139269 A1 | 6/2009 | Filippov et al. |
| 2009/0139270 A1 | 6/2009 | Filippov et al. |
| 2009/0217710 A1 | 9/2009 | Costello, III et al. |
| 2011/0239709 A1 | 10/2011 | Okada |
| 2011/0274404 A1 | 11/2011 | Okada |
| 2016/0229136 A1 | 8/2016 | Okada |
| 2016/0347646 A1 | 12/2016 | Okada |
| 2016/0362326 A1 | 12/2016 | Okada |

FOREIGN PATENT DOCUMENTS

| | | | |
|---|---|---|---|
| CN | 102245522 | A | 11/2011 |
| EP | 0999189 | A1 | 5/2000 |
| EP | 2220005 | A1 | 8/2010 |
| JP | 60-112638 | A | 6/1985 |
| JP | 62-3037 | A | 1/1987 |
| JP | 2-51439 | A | 2/1990 |
| JP | 2010-510957 | A | 4/2010 |
| JP | 2011-505326 | A | 2/2011 |
| JP | 5571958 | B | 8/2014 |
| JP | 5917736 | B1 | 5/2016 |
| WO | 2004042486 | A1 | 5/2004 |
| WO | 2008/066661 | A2 | 6/2008 |
| WO | 2009/070253 | A1 | 6/2009 |
| WO | 2009070253 | A1 | 6/2009 |
| WO | 2009108315 | A2 | 9/2009 |

OTHER PUBLICATIONS

Communication dated Apr. 3, 2018 from the State Intellectual Property Office of the P.R.C. in counterpart Application No. 201610330759.5.
Communication dated Jul. 25, 2017 from the Japanese Patent Office in counterpart application No. 2015-107279.
Communication dated Mar. 22, 2016 from Japanese Patent Office in counterpart Application No. 2015-024688.
Communication dated May 10, 2017 from U.S. Patent & Trademark Office in counterpart U.S. Appl. No. 15/147,180.
Communication dated May 15, 2017 from U.S. Patent & Trademark Office in counterpart U.S. Appl. No. 15/175,222.
Communication dated Nov. 30, 2017 from the Japanese Patent Office in counterpart application No. 2016-10079611.9.
Japanese Office Action for JP 2015-024688 dated Jul. 28, 2015.
Astrom et al., "PID Controllers, 2nd Edition", Instrument Society of America, 1995, pp. 5, 6, 59-70.
Communication dated Nov. 30, 2017 from the P.R.C. Patent Office in counterpart application No. 2016-10079611.9.
Communication dated Feb. 21, 2017 from U.S. Patent & Trademark Office in counterpart U.S. Appl. No. 15/017,813.
Communication dated Jun. 2, 2017 from U.S. Patent & Trademark Office in counterpart U.S. Appl. No. 15/017,813.
Notice of Allowability dated Dec. 4, 2017 from U.S. Patent & Trademark Office in counterpart U.S. Appl. No. 15/017,813.
Notice of Allowability dated Mar. 13, 2018 from U.S. Patent & Trademark Office in counterpart U.S. Appl. No. 15/017,813.
Corrected Notice of Allowability dated May 17, 2018 from U.S. Patent & Trademark Office in counterpart U.S. Appl. No. 15/017,813.
English Abstract and Machine Translation of JP 2-51439 A, published Feb. 21, 1990.
Communication dated May 28, 2018 from the State Intellectual Property Office of the P.R.C. in counterpart Application No. 201610390870.3.
Yao, C., et al., "Environmental Engineering Simulation and Control", Higher Education Press, Jul. 2010, p. 141, paragraph 1, 4 pages.
Yu, M., et al., "Integrated Wiring Technology and Engineering", Higher Education Press, Jun. 2008, p. 48, paragraph 3, 4 pages.

METHOD OF MANUFACTURING OPTICAL FIBER, OPTICAL FIBER MANUFACTURING APPARATUS, AND CONTROL APPARATUS THEREFOR

CROSS REFERENCE TO RELATED APPLICATIONS

This application is a Divisional of U.S. application Ser. No. 15/017,813, filed on Feb. 8, 2016, claiming priority benefit from, claiming priority from Japanese Patent Application No. 2015-024688 filed on Feb. 10, 2015, the contents of which are incorporated herein by reference.

BACKGROUND OF THE INVENTION

Field of the Invention

The present invention relates to a method of manufacturing an optical fiber, an optical fiber manufacturing apparatus, and a control apparatus that controls the manufacturing apparatus.

Description of the Related Art

Generally, in manufacture of an optical fiber, a method is employed which vertically and downwardly draws an optical fiber from an optical fiber preform along a linear pathway.

The overall height of the system thereof is limited and becomes a factor that affects the productivity of the manufacturing method. Because the height of the system becomes a main factor that limits the productivity, it is necessary to ensure the distance of a bare optical fiber in the system which is required to sufficiently cool the bare optical fiber obtained by drawing an optical fiber preform.

The above-described limitation can be eased by construction of new facilities such as new buildings; however, a huge cost is necessary in order to ease the limitation, if improvement in productivity is required in the future, it will be necessary to construct new facilities at great expense.

As a method of easing the limitation, a method of using a direction changing device that includes a noncontact retention mechanism and changes the direction in which a drawn fiber is drawn is known.

This noncontact retention mechanism is a mechanism that contactlessly retains an object by using a pressure of fluid such as air, and a direction changer that is provided with this mechanism can change the direction, in which a bare optical fiber (bare fiber) is drawn, without being in contact with the bare optical fiber.

By using this direction changer, the direction of a bare optical fiber which is fiber-drawn a optical fiber preform along a first pathway can be changed into a direction along a second pathway (for example, refer to Japanese Patent No. 5571958 and Japanese Unexamined Patent Application, First Publication No. S62-003037).

Japanese Patent No. 5571958 discloses a method of manufacturing an optical fiber, which uses a direction changing device that changes the direction of a drawn fiber. The instrument has a groove into which an optical fiber is to be introduced, and the groove has an opening formed therein. In this method, a gas that is introduced into the instrument is discharged through one flow inlet port, and a direction of an optical fiber is changed in a state where the optical fiber floats due to the pressure of the gas.

Japanese Unexamined Patent Application, First Publication No. S62-003037 discloses a direction changer, the direction changer has a guide groove that guides a bare optical fiber into, and gas outlet nozzles are formed on the bottom surface and both side surfaces of the guide groove (refer to Example and FIGS. 3 and 4). In this manufacturing method using the direction changer, a direction of an optical fiber is changed due to the pressure of the gas blown from four outlet nozzles in a state where the optical fiber floats.

The amount of flotation of the bare optical fiber is determined by the balance between: a pressure of the gas blown in a groove; and a drawing tension applied to a bare optical fiber. Therefore, in the case where the gas pressure and the drawing tension are constant, the amount of flotation of the bare optical fiber is also constant, and a stable fiber drawing is thereby possible.

However, in an actual manufacturing process, a drawing tension varies due to variation in an outer diameter of an optical fiber preform, variation in the drawing speed of a bare optical fiber, or the like, as a result, the amount of flotation of the bare optical fiber varies in some cases.

In the case where the drawing tension is low, as the amount of flotation of the bare optical fiber increases, a stability in a flotation state is degraded, and there is a concern that bare optical fiber is in contact with the inner surface of the groove of the direction changing device. In the case where the bare optical fiber comes into contact with the direction changing device, the bare optical fiber is damaged, and there is a possibility that the strength of the bare optical fiber is degraded. On the other hand, in the case where the drawing tension is high, as the amount of flotation of the bare optical fiber decreases, there is a concern that bare optical fiber is in contact with the inner surface of the groove of the direction changing device. In the case where the bare optical fiber comes into contact with the direction changing device, the bare optical fiber is damaged, and there is a possibility that the strength of the bare optical fiber is degraded.

Furthermore, in both cases where the drawing tension is high and low, as the position at which the bare optical fiber is introduced into a coating unit varies due to variation in the flotation position, and there is a concern that deviation in thickness of the coating occurs.

SUMMARY OF THE INVENTION

Some aspects of the invention were conceived in view of the above-described circumstances and have an object thereof to provide a method of manufacturing an optical fiber, an optical fiber manufacturing apparatus, and a control apparatus that controls the manufacturing apparatus, which can stabilize a flotation position of a bare optical fiber in a direction changer.

A first aspect of the invention provides a method of manufacturing an optical fiber, including: preparing one or more direction changers, each direction changer including a guide groove, an internal space into which fluid is introduced from an outside, and an outlet nozzle, the guide groove being configured to guide a bare optical fiber, the outlet nozzle being formed in the guide groove and being configured to blow off the fluid from the internal space and thereby cause the bare optical fiber to float inside the guide groove; drawing the bare optical fiber from an optical fiber preform, thereby forming the bare optical fiber (drawing step); providing a coated layer made of a resin on a periphery of the bare optical fiber (coating step); obtaining an optical fiber by curing the coated layer (curing step); changing the direction of the bare optical fiber at the position between the position at which the bare optical fiber is formed (the position in the drawing step, a bare-optical-fiber formation position) and the position at which the coated layer is provided on the periphery of the bare optical fiber (the position in the coating step, a coated-layer provision position) by use of the direction changer; detecting the position of the bare optical fiber in at least one of the direction changers; and adjusting the introduction flow rate of the fluid into the direction changer based on positional information obtained by the detection.

In the first aspect of the invention, it is preferable that the position of the bare optical fiber in the direction changer serving as part of the plurality of direction changers be detected and that introduction flow rates of the fluid into all of the direction changers be controlled based on positional information obtained by the detection.

In the first aspect of the invention, it is preferable that each of positions of the bare optical fiber in the plurality of direction changers be detected and that introduction flow rates of the fluid into the plurality of direction changers be individually controlled based on positional information obtained by the detection.

A second aspect of the invention provides a method of manufacturing an optical fiber, including: preparing one or more direction changers, each direction changer including a guide groove, an internal space into which fluid is introduced from an outside, and an outlet nozzle, the guide groove being configured to guide a bare optical fiber, the outlet nozzle being formed in the guide groove and being configured to blow off the fluid from the internal space and thereby cause the bare optical fiber to float inside the guide groove; previously obtaining a relationship between the position of the bare optical fiber in at least one of the direction changers, the introduction flow rate of the fluid into the direction changer, and the drawing tension that is to be applied to the optical fiber; drawing the bare optical fiber from an optical fiber preform, thereby forming the bare optical fiber (drawing step); providing a coated layer made of a resin on a periphery of the bare optical fiber (coating step); obtaining an optical fiber by curing the coated layer (curing step); changing the direction of the bare optical fiber at the position between the position at which the bare optical fiber is formed (the position in the drawing step, a bare-optical-fiber formation position) and the position at which the coated layer is provided on the periphery of the bare optical fiber (the position in the coating step, a coated-layer provision position) by use of the direction changer; and the introduction flow rate of the fluid into the direction changer is controlled based on the obtained relationship.

In the second aspect of the invention, it is preferable that a relationship between the position of the bare optical fiber in the direction changer serving as part of the plurality of direction changers, the introduction flow rate of the fluid into the direction changer, and the drawing tension that is to be applied to the optical fiber be previously obtained and that introduction flow rates of the fluid into all of the direction changers be controlled based on the obtained relationship.

In the second aspect of the invention, it is preferable that relationships among positions of the bare optical fiber in the respective plurality of direction changers, introduction flow rates of the fluid into the respective direction changers, and the drawing tensions that are to be applied to the optical fiber be previously obtained and that introduction flow rates of the fluid into the plurality of direction changers be individually controlled based on the obtained relationships.

A third aspect of the invention provides a control apparatus used in an optical fiber manufacturing apparatus, the manufacturing apparatus including: a drawing unit that forms a bare optical fiber by drawing the bare optical fiber from an optical fiber preform; a coating unit that provides a coated layer made of a resin on a periphery of the bare optical fiber; and a curing unit that cures the coated layer, the control apparatus including: one or more direction changers that change the direction of the bare optical fiber at the position between the drawing unit and the coating unit, each direction changer including a guide groove, an internal space into which fluid is introduced from an outside, and an outlet nozzle, the guide groove being configured to guide a bare optical fiber, the outlet nozzle being formed in the guide groove and being configured to blow off the fluid from the internal space and thereby cause the bare optical fiber to float inside the guide groove; a detector that detects the position of the bare optical fiber in the direction changer; and a controller that controls the introduction flow rate of the fluid into the direction changer based on positional information associated with the bare optical fiber which is measured in the detector, the controller detecting the position of the bare optical fiber in at least one of the direction changers and thereby controlling the introduction flow rate of the fluid into the direction changer based on the positional information obtained by the detection.

In the third aspect of the invention, it is preferable that the position of the bare optical fiber in the direction changer serving as part of the plurality of direction changers is detected, and introduction flow rates of the fluid into all of the direction changers be controlled based on positional information obtained by the detection.

In the third aspect of the invention, it is preferable that each of positions of the bare optical fiber in the plurality of direction changers be detected and that introduction flow rates of the fluid into the plurality of direction changers be individually controlled based on positional information obtained by the detection.

A fourth aspect of the invention provides a control apparatus used in an optical fiber manufacturing apparatus, the manufacturing apparatus including: a drawing unit that forms a bare optical fiber by drawing the bare optical fiber from an optical fiber preform; a coating unit that provides a coated layer made of a resin on a periphery of the bare optical fiber; and a curing unit that cures the coated layer, the control apparatus including: one or more direction changers that change the direction of the bare optical fiber at the position between the drawing unit and the coating unit, each direction changer including a guide groove, an internal space into which fluid is introduced from an outside, and an outlet nozzle, the guide groove being configured to guide a bare optical fiber, the outlet nozzle being formed in the guide groove and being configured to blow off the fluid from the internal space and thereby cause the bare optical fiber to float inside the guide groove; a detector that detects the position of the bare optical fiber in the direction changer; and a controller that controls the introduction flow rate of the fluid into the direction changer based on positional information associated with the bare optical fiber which is measured in the detector, the controller controlling the introduction flow rate of the fluid into the direction changer based on a relationship between the position of the bare optical fiber in at least one of the direction changers, the introduction flow rate of the fluid into the direction changer, and the drawing tension that is to be applied to the optical fiber.

In the fourth aspect of the invention, it is preferable that the controller control introduction flow rates of the fluid into all of the direction changers based on a relationship between the position of the bare optical fiber in the direction changer serving as part of the plurality of direction changers, the introduction flow rate of the fluid into the direction changer, and the drawing tension that is to be applied to the optical fiber.

In the fourth aspect of the invention, it is preferable that the controller individually control introduction flow rates of the fluid into the plurality of direction changers based on relationships among positions of the bare optical fiber in the respective plurality of direction changers, introduction flow rates of the fluid into the respective direction changers, and the drawing tensions that are to be applied to the optical fiber.

A fifth aspect of the invention provides an optical fiber manufacturing apparatus including: a control apparatus according to the third aspect or the fourth aspect; a drawing unit that forms a bare optical fiber by drawing the bare optical fiber from an optical fiber preform; a coating unit that provide a coated layer made of a resin on a periphery of the bare optical fiber; and a curing unit that cures the coated layer.

Effects of the Invention

According to the aspects of the invention, as a result of controlling the introduction flow rate of the fluid into the direction changer based on positional information associated with the bare optical fiber, the flow velocity of the fluid discharged to the guide groove from the outlet nozzle in the direction changer is adjusted, and it is possible to adjust the amount of flotation of the bare optical fiber.

Consequently, the flotation position of the bare optical fiber in the direction changer can be stabilized, the flotation of the bare optical fiber can be prevented from being unstable due to excess or lack of flotation, and it is possible to avoid the bare optical fiber from being in contact with the inner side surface of the guide groove. Accordingly, as a result of using the direction changer, it is possible to manufacture the optical fiber with a high level of yield without damage to the bare optical fiber. Additionally, since the availability of the manufacturing apparatus is increasing, it is possible to improve productivity of the optical fiber, and the cost of manufacturing the optical fiber can be reduced.

Furthermore, since the flotation position of the bare optical fiber is stabilized in the direction changer, the fiber inlet position at which the bare optical fiber enters the coating unit is constant. Therefore, deviation in thickness of the coating is prevented, and it is possible to manufacture an optical fiber having a stable quality.

DETAILED DESCRIPTION OF THE INVENTION

Figure 1:
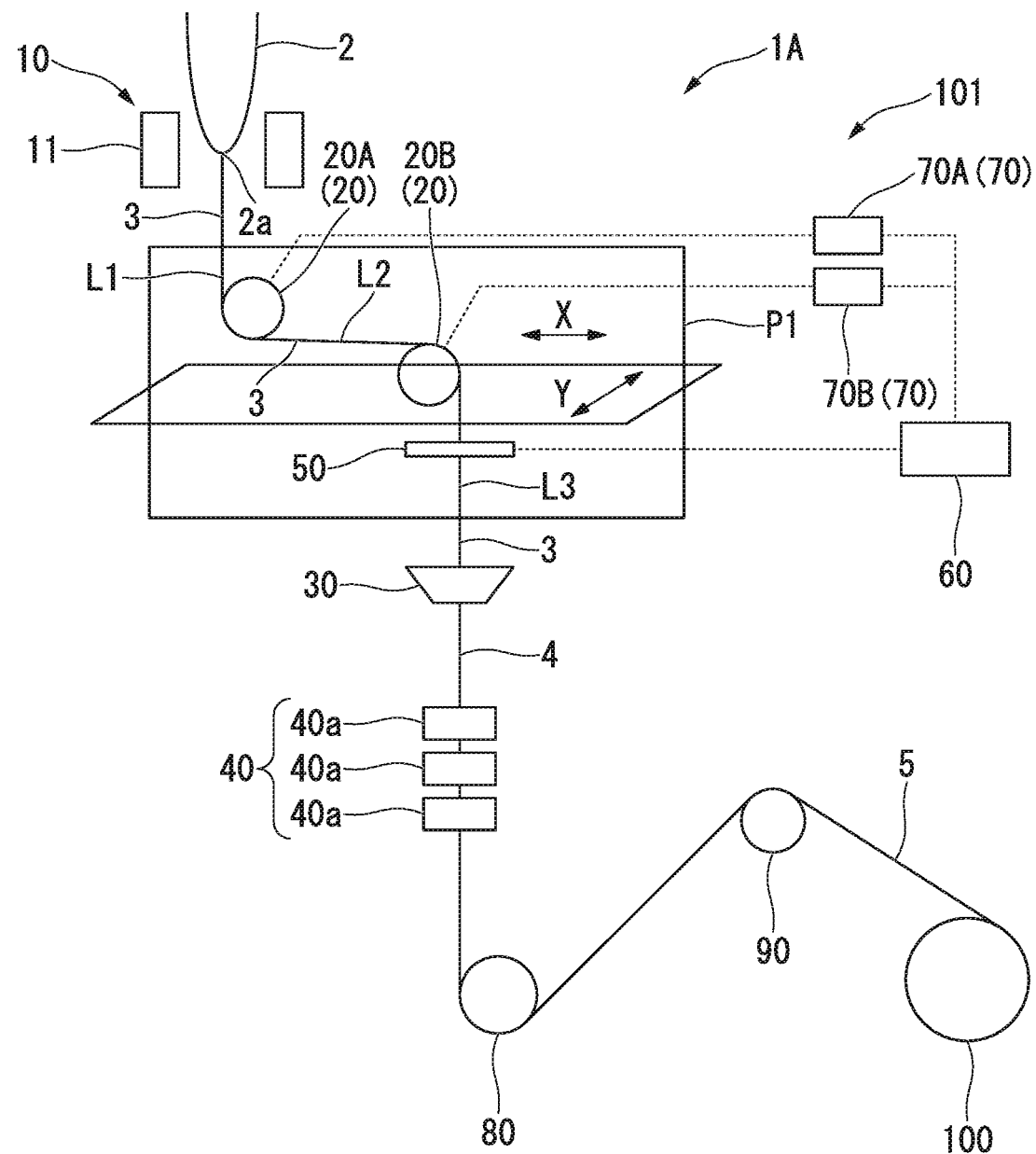
FIG. 1 is a schematic diagram showing the configuration of an optical fiber manufacturing apparatus according to a first embodiment of the invention.

FIG. 1 is a schematic diagram showing the configuration of a manufacturing apparatus 1A which serves as an optical fiber manufacturing apparatus according to a first embodiment of the invention.

The manufacturing apparatus 1A includes a drawing unit 10, direction changers 20 (20A, 20B), a coating unit 30, a curing unit 40, a detector 50, a controller 60, a flow controller 70, a pulley 80, a pick-up unit 90, and winding unit 100.

The direction changers 20, the detector 50, the controller 60, and the flow controllers 70 (70A, 70B) constitute a control apparatus 101.

The drawing unit 10 is provided with a heating furnace 11, an optical fiber preform 2 is heated by the heating furnace 11, and a bare optical fiber 3 is formed by drawing the heated preform.

The direction changers 20 change a direction of the bare optical fiber 3. As shown in FIG. 1, two direction changers 20 are used in the manufacturing apparatus 1A. The direction changers 20 are each referred to as a first direction changer 20A and a second direction changer 20B in order from the upstream side to the downstream side in the fiber drawing direction.

The first direction changer 20A changes, by 90 degrees, the direction of the bare optical fiber 3 that is drawn from the optical fiber preform 2 in the downward vertical direction (first pathway L1), as a result, the direction of the bare optical fiber 3 is in the horizontal direction (second pathway L2).

A plane including the first pathway L1 and the second pathway L2 is referred to as P1. The X-direction is the direction extending in the second pathway L2 in the plane P1 and the Y-direction is the direction perpendicular to the plane P1.

The second direction changer 20B changes the direction of the bare optical fiber 3 by 90 degrees, as a result, the direction of the bare optical fiber 3 is in the downward vertical direction (third pathway L3).

The coating unit 30 is configured to coat (coating) the periphery of the bare optical fiber 3 with a coating material such as a urethane acrylate-based resin, thereby forms a coated layer, and an optical fiber production intermediate 4 is obtained.

The resin coating is, for example, a bilayer coating such that a material used to form a first coated layer having a lower Young's modulus is applied to the inside thereof and a material used to form a second coated layer having a higher Young's modulus is applied to the outside thereof. The material used to form the resin coating is, for example, an ultraviolet curable resin.

The coating unit 30 may be configured to independently apply the first coated layer and the second coated layer or may be configured to simultaneously apply the first coated layer and the second coated layer.

The curing unit 40 is provided with one or more UV lamps 40a, is configured to cure the coated layer of the optical fiber production intermediate 4 and thereby form an optical fiber 5. For example, the curing unit 40 includes UV lamps 40a which form a plurality of pairs thereof and are provided to sandwich spaces through which the optical fiber production intermediate 4 passes.

The detector 50 is provided in the downstream side of the second direction changer 20B in the fiber drawing direction and detects the position of the bare optical fiber 3 in the third pathway L3. As the detector 50, for example, a position sensor using a laser can be used.

When the amount of flotation of the bare optical fiber 3 in the second direction changer 20B increases or decreases, the position of the bare optical fiber 3 in the X-direction in the third pathway L3 varies. For this reason, the detector 50 can detect the amount of flotation of the bare optical fiber 3 in the second direction changer 20B based on positional information of the bare optical fiber 3.

The detector 50 outputs a detection signal to the controller 60 based on information associated with the position of the bare optical fiber 3.

The flow controller 70 can adjust the flow rates of the fluid which are to be introduced into the first direction changer 20A and the second direction changer 20B. The flow controller 70 can be provided in, for example, an introduction passage (e.g., introduction passage 26 shown in FIG. 3) which introduces fluid into the first direction changer 20A and the second direction changer 20B. As the flow controller 70, a mass-flow controller (MFC) or the like can be used.

Two flow controllers 70 are used in the manufacturing apparatus 1A shown in FIG. 1. Of the two flow controllers 70, the flow controller 70 that adjusts the flow rate of the fluid introduced into the first direction changer 20A is referred to as a first flow controller 70A, and the flow controller 70 that adjusts the flow rate of the fluid introduced into the second direction changer 20B is referred to as a second flow controller 70B.

The controller 60 controls the flow rates of the fluid which are introduced into the first direction changer 20A and the second direction changer 20B based on a detection signal output from the detector 50 by use of the first flow controller 70A and the second flow controller 70B and thereby can adjust the amounts of flotation of the bare optical fiber 3 in the first direction changer 20A and the second direction changer 20B.

The direction of the optical fiber 5 is changed by the pulley 80, and the optical fiber 5 is picked up by the pick-up unit 90 and is wound around the winding unit 100.

The pick-up unit 90 is, for example, a pick-up capstan, and the pick-up unit determines the drawing speed. The drawing speed is greater than or equal to, for example, 1500 m/min.

The winding unit 100 is a bobbin that winds the optical fiber 5 therearound.

The outer diameter of the optical fiber preform 2 is greater than or equal to, for example, 100 mm, and the length of the optical fiber 5 manufactured from the optical fiber preform 2 is, for example, several thousands km.

Hereinbelow, configurations of a direction changer 20 will be described.

Figure 3:
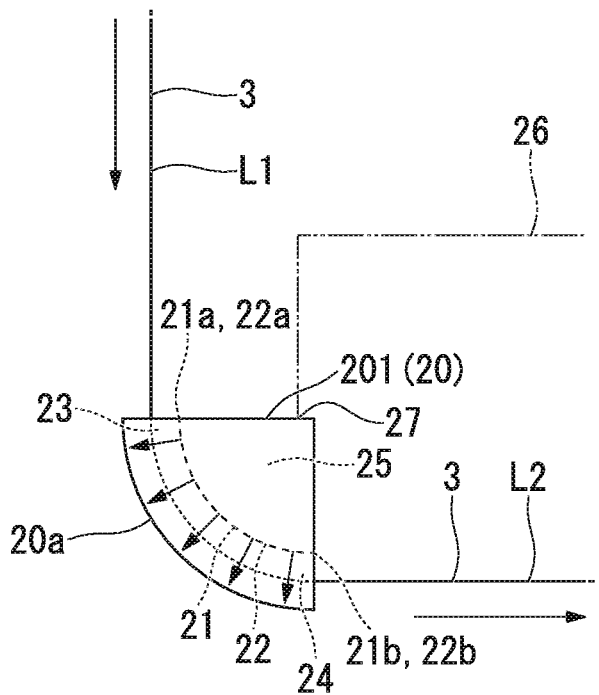
FIG. 3 is a front view showing an example of the direction changer.

As shown in FIG. 3, a direction changer 201 is a first example of the direction changer 20 and can change a direction of the bare optical fiber 3 by 90 degrees.

The direction changer 201 is formed in a quarter-circular shape (arc) in plan view and has an outer peripheral face 20a and a guide groove 21. The guide groove 21 is formed on and along the entire periphery of the outer peripheral face 20a. The center of the direction changer 201 coincides with the Y-direction, and the direction changer 201 is provided in the attitude in which the radial direction D1 (refer to FIG. 2) is in the direction along the plane P1 (refer to FIG. 1). Here, the direction along the outer peripheral face 20a formed in a circular-arc shape in plan view is referred to as a circumferential direction.

An outlet nozzle 22 is formed at the bottom of the guide groove 21 and along the guide groove 21. The outlet nozzle blows fluid (e.g., air) into the guide groove, and the fluid (e.g., air) causes the bare optical fiber 3, which is arranged along and introduced into the guide groove 21, to float. The outlet nozzle 22 is formed over the entire guide groove 21.

A first end 22a (one end) of the outlet nozzle 22 reaches a first end 21a (one end) of the guide groove 21, and a second end 22b (the other end) of the outlet nozzle 22 reaches a second end 21b (the other end) of the guide groove 21.

Figure 2:
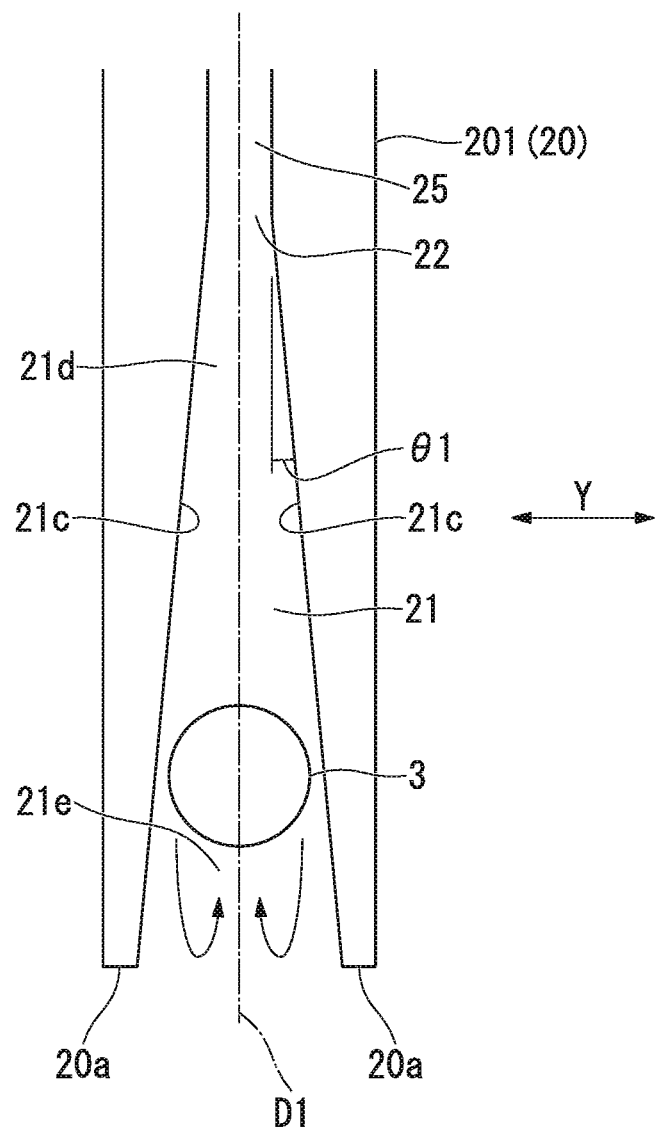
FIG. 2 is a cross-sectional schematic view showing the structure of a direction changer of the manufacturing apparatus shown in FIG. 1.

As shown in FIG. 2, the direction changer 201 is configured to be able to discharge fluid (for example, air) of the inner space (fluid reservoir 25) into the guide groove 21 through the outlet nozzle 22. The inner space is ensured in the direction changer 201.

The direction changer 201 can be configured to introduce the fluid into the fluid reservoir 25 from the outside and discharge the fluid into the guide groove 21 through the outlet nozzle 22.

As shown in FIG. 3, it is preferable that an introduction portion 27, which is connected to the introduction passage 26 that introduces fluid from the outside to the fluid reservoir 25, be formed on the direction changer 201. The introduction portion 27 is, for example, an introduction port into which fluid is introduced.

It is preferable that the guide groove 21 be formed to be inclined with respect to the radial direction D1 so that the space (length in the Y-direction) between the inner side surfaces 21c thereof gradually increases in the radial-outer direction. It is preferable that the inclination angles θ1 of the two inner side surfaces 21c with respect to the radial direction D1 are equal to each other.

In the direction changer 201 shown in FIG. 3, the bare optical fiber 3 enters the first end 21a of the guide groove 21 that is formed in a quarter-circular shape (arc) and exits from the second end 21b, and the direction of the bare optical fiber is thereby changed by 90 degrees. A fiber inlet portion 23 to which the bare optical fiber 3 enters is a portion including the first end 21a of the guide groove 21, and a fiber outlet portion 24 from which the bare optical fiber 3 exits is a portion including the second end 21b of the guide groove 21.

Figure 4:
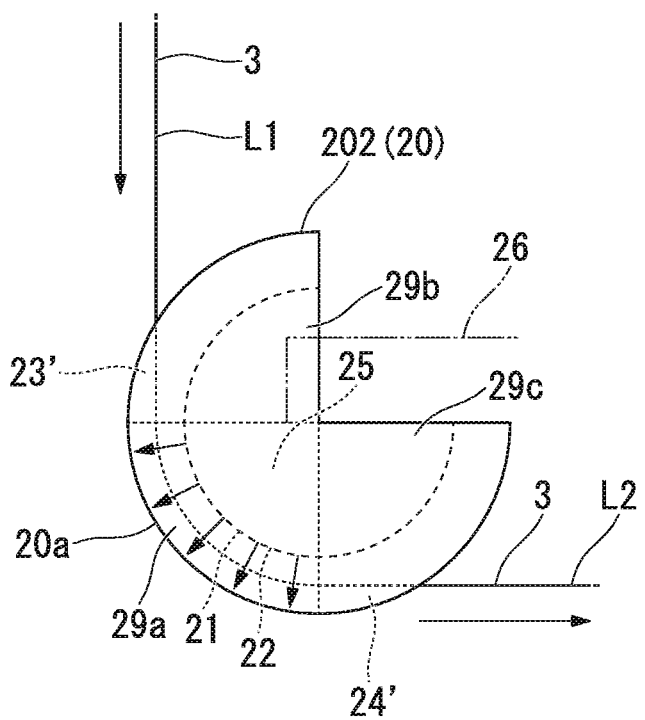
FIG. 4 is a front view showing a modified example of the direction changer shown in FIG. 3.

A direction changer 202 shown in FIG. 4 is a modified example of the direction changer 201 and is formed in a three-quarter-circular shape (arc) in plan view. Hereinbelow, identical reference numerals are used for the elements which are identical to those of the above description, and the explanations thereof are simplified here.

The direction changer 202 is configured to include: a body part 29a having the same structure as that of the direction changer 201 shown in FIG. 3; and auxiliary parts 29b and 29c, each of which has the same structure as that of the body part 29a and which are consecutively connected to the incoming side and the outgoing side of the body part 29a. Regarding the direction changer 202, the bare optical fiber 3 enters the guide groove 21 of the body part 29a through the fiber inlet portion 23', the direction of the bare optical fiber is changed by 90 degrees by the body part 29a, thereafter, the bare optical fiber exits from the body part through the fiber outlet portion 24'. Therefore, the basic function of the direction changer 202 is the same as that of the direction changer 201.

The direction changers 201 and 202 can change the direction of the bare optical fiber 3 by 90 degrees, and therefore can be used as the first direction changer 20A and the second direction changer 20B as shown in FIG. 1.

Next, a method according to a first embodiment of the invention will be described which manufactures an optical fiber in the case of using, for example, the manufacturing apparatus 1A.

(Drawing Step)

As shown in FIG. 1, in the drawing unit 10, the optical fiber preform 2 is heated and drawn, and the bare optical fiber 3 is formed.

(Direction Change by Use of Direction Changer)

The direction of the bare optical fiber 3 that is drawn from the optical fiber preform 2 in the downward vertical direction (first pathway L1) is changed by 90 degrees by the first direction changer 20A, as a result, the direction of the bare optical fiber 3 is in the horizontal direction (second pathway L2).

The direction of the bare optical fiber 3 is changed by 90 degrees by the second direction changer 20B and is in the downward vertical direction (third pathway L3).

As shown in FIG. 2, as a result of discharging the fluid (for example, air) in the fluid reservoir 25 into the guide groove 21 through the outlet nozzle 22 in the first direction changer 20A and the second direction changer 20B, it is possible to cause the bare optical fiber 3 to float. Particularly, since a difference in pressure between a deep portion 21$d$ of the guide groove 21 and a shallow portion 21$e$ thereof increases due to the discharged air, a force in the radial-outer direction of the direction changer is applied to the bare optical fiber 3, and the bare optical fiber 3 floats.

The amount of flotation of the bare optical fiber is determined by the balance between: a flow velocity of fluid which is discharged from the outlet nozzle 22 into the guide groove 21; and a drawing tension applied to the bare optical fiber 3.

In the case where a drawing tension of the bare optical fiber 3 is constant, an amount of flotation of the bare optical fiber 3 depends on a flow velocity of fluid; that is, as a flow velocity of fluid is higher, the amount of flotation increases; in contrast, as a flow velocity of fluid is slower, the amount of flotation decreases. On the other hand, in the case where a flow velocity of fluid is constant, as a drawing tension is higher, the amount of flotation decreases; as a drawing tension is smaller, the amount of flotation increases.

As shown in FIG. 1, as a method of controlling the flow velocity of fluid in the first direction changer 20A and the second direction changer 20B, for example, two methods are applicable. Here, a first control method will be described. A second control method will be described later.

The first control method is a method of controlling the introduction flow rate of the fluid in the first direction changer 20A and the second direction changer 20B based on the positional information on the bare optical fiber 3 which is obtained by the detector 50.

As the amount of flotation of the bare optical fiber 3 in the second direction changer 20B increases or decreases, the position of the bare optical fiber 3 in the X-direction in the third pathway L3 varies. This control method utilizes such variation in the position of the bare optical fiber 3.

The detector 50 outputs a detection signal to the controller 60 based on the positional information associated with the bare optical fiber 3 in the third pathway L3. This detection signal is, for example, a signal corresponding to the position of the bare optical fiber 3 inside the guide groove 21 in the second direction changer 20B.

The controller 60 controls introduction flow rates of the fluid which are introduced into the first direction changer 20A and the second direction changer 20B based on the detection signal, by use of the first flow controller 70A and the second flow controller 70B. Because of this, the flow velocity of the fluid discharged to the guide groove 21 from the outlet nozzle 22 in the first direction changer 20A and the second direction changer 20B is controlled, and it is possible to adjust the amount of flotation of the bare optical fiber 3.

In the case where, for example, as the amount of flotation of the bare optical fiber 3 decreases, the bare optical fiber 3 in the third pathway L3 is displaced in the direction such that the bare optical fiber approaches the second direction changer 20B, the controller 60 increases the introduction flow rates of the fluid which are introduced into the first direction changer 20A and the second direction changer 20B. As a result, the flow velocity of the fluid discharged from the outlet nozzle 22 to the guide groove 21 increases in the first direction changer 20A and the second direction changer 20B, the amount of flotation of the bare optical fiber 3 is recovered.

On the other hand, in the case where, as the amount of flotation of the bare optical fiber 3 increases, the bare optical fiber 3 in the third pathway L3 is displaced in a direction such that distance between the bare optical fiber and the second direction changer 20B increases, the controller 60 reduces the introduction flow rates of the fluid which are introduced into the first direction changer 20A and the second direction changer 20B. Consequently, the flow velocity of the fluid discharged from the outlet nozzle 22 to the guide groove 21 decreases in the first direction changer 20A and the second direction changer 20B, an increase in the amount of flotation of the bare optical fiber 3 is limited.

As a control method, feedback control such as PID control is preferable. Accordingly, it is possible to carry out control of the flow rate of the fluid with a high degree of responsiveness.

Particularly, in the case where the detector (first detector) that is used in the first direction changer 20A is provided between the first direction changer 20A and the second direction changer 20B, the introduction flow rate of the fluid which is introduced into the first direction changer 20A is controlled based on the detection signal output from the first detector by use of the first flow controller 70A. Accordingly, in the first direction changer 20A, the flow velocity of the fluid discharged from the outlet nozzle 22 to the guide groove 21 is controlled, and it is possible to adjust the amount of flotation of the bare optical fiber 3.

In this case, the introduction flow rate of the fluid which is introduced into the second direction changer 20B is controlled based on the detection signal output from the detector 50 (second detector) by use of the second flow controller 70B. Accordingly, in the second direction changer 20B, the flow velocity of the fluid discharged from the outlet nozzle 22 to the guide groove 21 is controlled, and it is possible to adjust the amount of flotation of the bare optical fiber 3.

(Coating Step)

In the coating unit 30, the optical fiber production intermediate 4 is obtained by forming a coated layer by applying a coating material such as a urethane acrylate based resin onto the periphery of the bare optical fiber 3.

(Curing Step)

In the curing unit 40, the coated layer of the optical fiber production intermediate 4 is cured by irradiating the coating material with UV light by the UV lamp 40$a$ or the like, and the optical fiber 5 is thereby formed.

The direction of the optical fiber 5 is changed by the pulley 80, and the optical fiber 5 is picked up by the pick-up unit 90 and is wound around the winding unit 100.

According to the manufacturing method, as a result of controlling the introduction flow rates of the fluid which are introduced into the first direction changer 20A and the second direction changer 20B based on the positional information associated with the bare optical fiber 3, the flow velocity of the fluid discharged from the outlet nozzle 22 to the guide groove 21 is adjusted in the first direction changer 20A and the second direction changer 20B, and it is possible to adjust the amount of flotation of the bare optical fiber 3.

For this reason, it is possible to stabilize the flotation position of the bare optical fiber 3 in the first direction changer 20A and the second direction changer 20B, and it is possible to avoid the bare optical fiber 3 from coming into contact with the inner side surface 21c of the guide groove 21 due to excess or lack of flotation. Accordingly, as a result of using the first direction changer 20A and the second direction changer 20B, it is possible to manufacture the optical fiber 5 with a high level of yield without damage to the bare optical fiber 3. Additionally, since the availability of the manufacturing apparatus 1A is increasing, it is possible to improve productivity of the optical fiber, and the cost of manufacturing the optical fiber can be reduced.

Furthermore, since the flotation positions of the bare optical fiber 3 are stabilized in the first direction changer 20A and the second direction changer 20B, the fiber inlet position at which the bare optical fiber 3 enters the coating unit 30 is constant. Therefore, deviation in thickness of the coating is prevented, and it is possible to manufacture an optical fiber 5 having a stable quality.

According to the manufacturing method, since amounts of fluid are controlled in all of direction changers 20 (the first direction changer 20A and the second direction changer 20B), it is possible to accurately control the amount of flotation.

Figure 5:
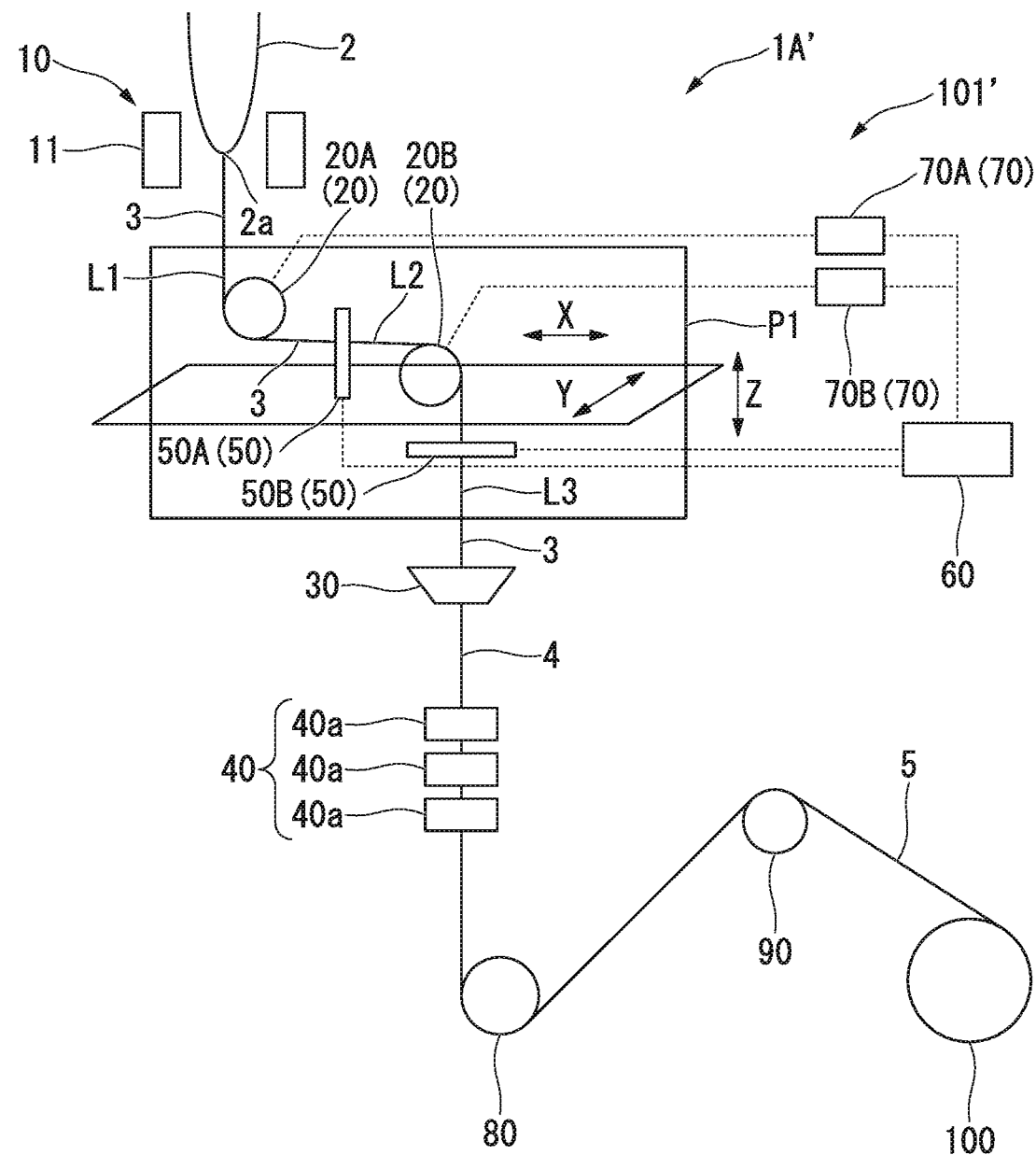
FIG. 5 is a schematic diagram showing a modified example of an optical fiber manufacturing apparatus according to a first embodiment.

FIG. 5 is a schematic diagram showing a manufacturing apparatus 1A' serving as a modified example of the manufacturing apparatus 1A shown in FIG. 1.

The manufacturing apparatus 1A' is different from the manufacturing apparatus 1A shown in FIG. 1 in that the detector 50 is provided with a first detector 50A and a second detector 50B. The direction changer 20, the detectors 50 (50A, 50B), the controller 60, and the flow controllers 70 (70A, 70B) constitute the control apparatus 101'.

The first detector 50A is provided at the downstream side of the first direction changer 20A in the fiber drawing direction and detects the position of the bare optical fiber 3 in the second pathway L2. The second detector 50B is provided at the downstream side of the second direction changer 20B in the fiber drawing direction and detects the position of the bare optical fiber 3 in the third pathway L3. As the first detector 50A and the second detector 50B, for example, a laser position sensor can be used.

When the amount of flotation of the bare optical fiber 3 in the first direction changer 20A increases or decreases, the position of the bare optical fiber 3 in the Z-direction (the direction perpendicular to the X-direction and in the Y-direction) in the second pathway L2 varies. For this reason, the first detector 50A can detect the amount of flotation of the bare optical fiber 3 in the first direction changer 20A based on positional information of the bare optical fiber 3.

When the amount of flotation of the bare optical fiber 3 in the second direction changer 20B increases or decreases, the position of the bare optical fiber 3 in the X-direction in the third pathway L3 varies. Accordingly, the second detector 50B can detect the amount of flotation of the bare optical fiber 3 in the second direction changer 20B based on positional information of the bare optical fiber 3.

The first detector 50A and the second detector 50B output a detection signal to the controller 60 based on information associated with the position of the bare optical fiber 3.

The controller 60 uses the first flow controller 70A, controls the introduction flow rate of the fluid which is introduced into the first direction changer 20A based on the detection signal output from the first detector 50A, and can adjust the amount of flotation of the bare optical fiber 3 in the first direction changer 20A.

The controller 60 uses the second flow controller 70B, controls the introduction flow rate of the fluid which is introduced into the second direction changer 20B based on the detection signal output from the second detector 50B, and can adjust the amount of flotation of the bare optical fiber 3 in the second direction changer 20B.

According to the manufacturing method, since the amount of fluid is individually controlled in each of the first direction changer 20A and the second direction changer 20B, it is possible to reliably stabilize the flotation position of the bare optical fiber 3 in each of the first direction changer 20A and the second direction changer 20B.

Figure 6:
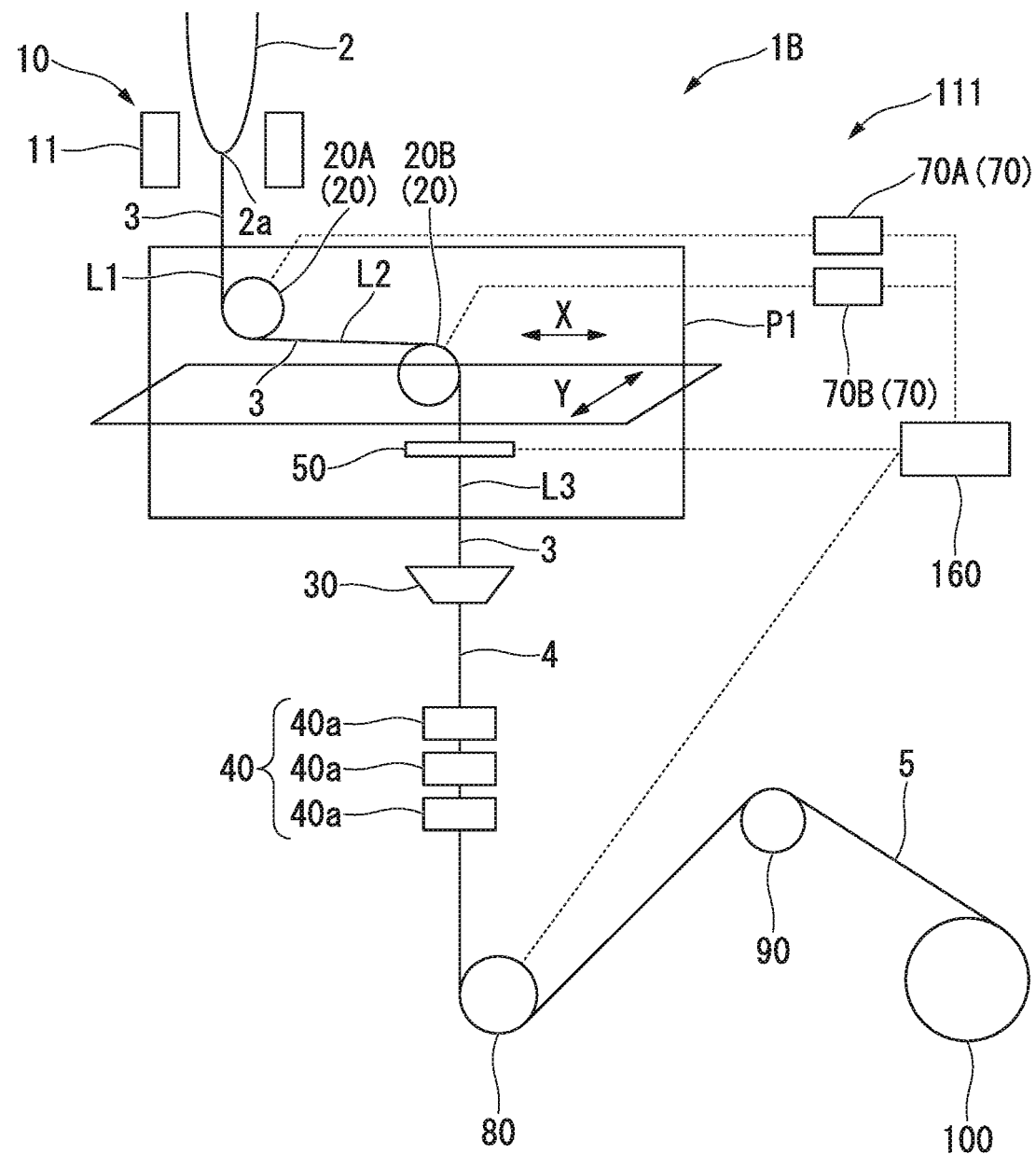
FIG. 6 is a schematic diagram showing the configuration of an optical fiber manufacturing apparatus according to a second embodiment of the invention.

FIG. 6 is a schematic diagram showing the configuration of a manufacturing apparatus 1B which serves as an optical fiber manufacturing apparatus according to a second embodiment of the invention.

The manufacturing apparatus 1B can carry out the aforementioned second control method. As an example of using the manufacturing apparatus 1B, a method of manufacturing an optical fiber according to the second embodiment of the invention will be described.

The manufacturing apparatus 1B includes a controller 160 instead of the controller 60. In the manufacturing apparatus 1B, it is possible to measure a drawing tension of the optical fiber 5 by use of a load sensor (not shown in the figure) provided on the pulley 80. The load sensor outputs a measurement signal to the controller 160 based on a measurement value of the drawing tension of the optical fiber 5.

The detector 50 outputs a detection signal to the controller 160 based on information associated with the position of the bare optical fiber 3.

The direction changer 20, the detector 50, the controller 160, and the flow controllers 70 (70A, 70B) constitute a control apparatus 111. The other configurations of the manufacturing apparatus 1B are the same as those of the manufacturing apparatus 1A shown in FIG. 1.

The drawing step, the coating step, and the curing step of the manufacturing method according to the second embodiment are the same as those of the first embodiment.

In the manufacturing method according to the second embodiment, as a method of controlling introduction flow rates of the fluid in the first direction changer 20A and the second direction changer 20B, a second control method is adopted. In the second control method, data associated with introduction flow rates of fluid such that the amount of flotation of the bare optical fiber 3 in the second direction changer 20B is in a proper range is previously obtained. Particularly, such data is obtained for each of drawing tensions (for each of predetermined drawing tensions). The second control method utilizes this data.

That is, the relationship among the position of the bare optical fiber 3 in the second direction changer 20B and the introduction flow rate of the fluid which is introduced into the second direction changer 20B is previously obtained for each of drawing tensions. Based on the relationships (particularly, relationship among the position of the bare optical fiber 3, the introduction flow rate of the fluid, and the drawing tension), the introduction flow rates of the fluid which are introduced into the first direction changer 20A and the second direction changer 20B are controlled by use of the first flow controller 70A and the second flow controller 70B.

The detector 50 obtains the positional information associated with the bare optical fiber 3 in the second direction changer 20B.

In other cases, after the relationship between the position of the bare optical fiber 3 and the introduction flow rate of the fluid which is introduced into the second direction changer 20B is obtained, the detector 50 may be removed.

Particularly, a load sensor (not shown in the figure) provided on the pulley 80 outputs a detection signal obtained based on the drawing tension of the optical fiber 5 to the controller 160.

The controller 160 uses the first flow controller 70A and the second flow controller 70B and controls the introduction flow rates of the fluid which are introduced into the first direction changer 20A and the second direction changer 20B based on the measurement signal output from the load sensor. Because of this, the flow velocity of the fluid discharged to the guide groove 21 from the outlet nozzle 22 in the first direction changer 20A and the second direction changer 20B is adjusted, and it is possible to adjust the amount of flotation of the bare optical fiber 3.

As a control method, proportional control is preferable.

As described above, amounts of flotation of the bare optical fiber 3 in the first direction changer 20A and the second direction changer 20B depend on a drawing tension. Particularly, as a drawing tension is higher, the flotation of the bare optical fiber 3 decreases; as a drawing tension is smaller, the flotation of the bare optical fiber 3 increases.

Consequently, as the controller 160 controls the introduction flow rates of the fluid which are introduced into the first direction changer 20A and the second direction changer 20B based on the measurement value of the drawing tension of the optical fiber 5 by use of the first flow controller 70A and the second flow controller 70B, the flow velocity of the fluid discharged from the outlet nozzle 22 to the guide groove 21 is adjusted in the first direction changer 20A and the second direction changer 20B, and it is possible to adjust the flotation of the bare optical fiber 3.

In the coating unit 30, the optical fiber production intermediate 4 is obtained by forming a coated layer by coating the periphery of the bare optical fiber 3 with a coating material.

Next, in the curing unit 40, the coated layer of the optical fiber production intermediate 4 is cured by irradiating the coating material with UV light by the UV lamp 40a or the like, and the optical fiber 5 is thereby formed.

The direction of the optical fiber 5 is changed by the pulley 80, and the optical fiber 5 is picked up by the pick-up unit 90 and is wound around the winding unit 100.

According to the manufacturing method, as a result of controlling the introduction flow rates of the fluid which are introduced into the first direction changer 20A and the second direction changer 20B based on the measurement value of the drawing tension of the optical fiber 5, the flow velocity of the fluid discharged from the outlet nozzle 22 to the guide groove 21 is adjusted in the first direction changer 20A and the second direction changer 20B, and it is possible to adjust the amount of flotation of the bare optical fiber 3.

For this reason, it is possible to stabilize the flotation position of the bare optical fiber 3 in the first direction changer 20A and the second direction changer 20B, and it is possible to avoid the bare optical fiber 3 from coming into contact with the inner side surface 21c of the guide groove 21 due to excess or lack of flotation. Accordingly, as a result of using the first direction changer 20A and the second direction changer 20B, it is possible to manufacture the optical fiber 5 with a high level of yield without damage to the bare optical fiber 3. Additionally, since the availability of the manufacturing apparatus 1A is increasing, it is possible to improve productivity of the optical fiber, and the cost of manufacturing the optical fiber can be reduced.

Moreover, since the flotation positions of the bare optical fiber 3 are stabilized in the first direction changer 20A and the second direction changer 20B, the fiber inlet position at which the bare optical fiber 3 enters the coating unit 30 is constant. Therefore, deviation in thickness of the coating is prevented, and it is possible to manufacture an optical fiber 5 having a stable quality.

According to the manufacturing method, since amounts of fluid are controlled in all of direction changers 20 (the first direction changer 20A and the second direction changer 20B), it is possible to accurately control the amount of flotation.

Figure 7:
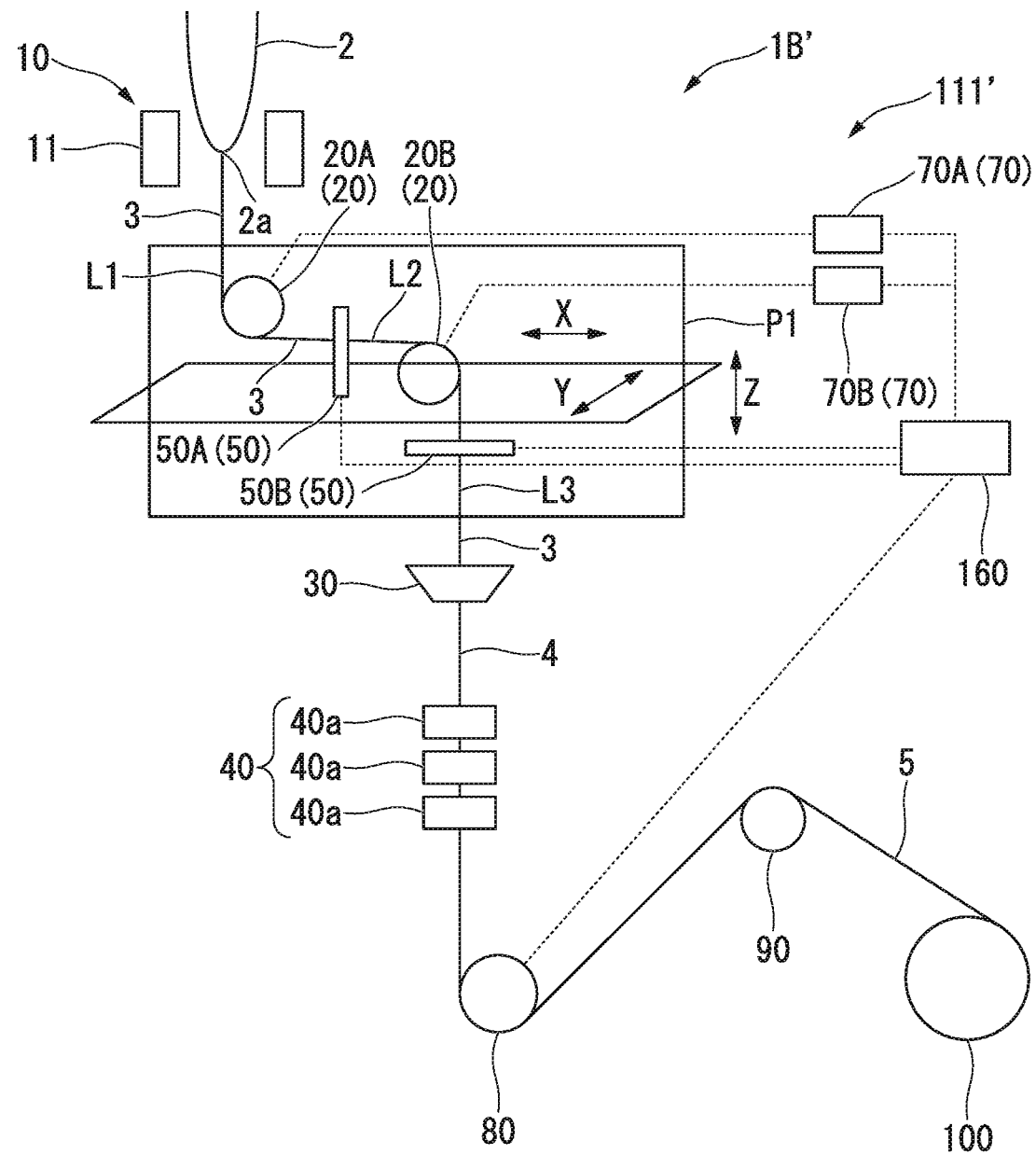
FIG. 7 is a schematic diagram showing a modified example of an optical fiber manufacturing apparatus according to a second embodiment.

FIG. 7 is a schematic diagram showing a manufacturing apparatus 1B' serving as a modified example of the manufacturing apparatus 1B shown in FIG. 6.

The manufacturing apparatus 1B' is different from the manufacturing apparatus 1B shown in FIG. 6 in that the detector 50 is provided with a first detector 50A and a second detector 50B.

The detectors 50 (50A, 50B) output a detection signal to the controller 160 based on information associated with the position of the bare optical fiber 3.

The direction changer 20, the detectors 50 (50A, 50B), the controller 160, and the flow controllers 70 (70A, 70B) constitute the control apparatus 111'.

In manufacture of the optical fiber 5 by use of the manufacturing apparatus 1B', data associated with introduction flow rates of fluid such that amounts of flotation of the bare optical fiber 3 in the first direction changer 20A and the second direction changer 20B are each in a proper range is previously obtained. Particularly, such data is obtained for each of drawing tensions (for each of predetermined drawing tensions). The manufacturing apparatus 1B' utilizes this data.

Particularly, as the relationship between the position of the bare optical fiber 3 in the first direction changer 20A and the introduction flow rate of the fluid which is introduced into the first direction changer 20A is previously searched for each of drawing tensions, the relationship between the position of the bare optical fiber 3, the introduction flow rate of the fluid, and the drawing tension is preliminarily obtained. The positional information associated with the bare optical fiber 3 in the first direction changer 20A is obtained by the first detector 50A.

Similarly, as the relationship between the position of the bare optical fiber 3 in the second direction changer 20B and the introduction flow rate of the fluid which is introduced into the second direction changer 20B is previously searched for each of drawing tensions, the relationship between the position of the bare optical fiber 3, the introduction flow rate of the fluid, and the drawing tension is preliminarily obtained. The second detector 50B obtains the positional information associated with the bare optical fiber 3 in the second direction changer 20B.

In other cases, after the relationship between the drawing tension, the positions of the bare optical fiber 3 in the first direction changer 20A and the second direction changer 20B, and the introduction flow rates of the fluid which are introduced into the first direction changer 20A and the second direction changer 20B is obtained, the detectors 50 (50A, 50B) may be removed.

The first detector 50A and the second detector 50B output a detection signal obtained based on the positional information associated with the bare optical fiber 3 to the controller 160.

The controller 160 controls the introduction flow rate of the fluid which is introduced into the first direction changer 20A based on the relationship between the position of the bare optical fiber 3, the introduction flow rate of the fluid, and the drawing tension which are associated with the first direction changer 20A, by use of the first flow controller 70A. Accordingly, it is possible to adjust the amount of flotation of the bare optical fiber 3 in the first direction changer 20A.

Similarly, the controller 160 controls the introduction flow rate of the fluid which is introduced into the second direction changer 20B based on the relationship between the position of the bare optical fiber 3, the introduction flow rate of the fluid, and the drawing tension which are associated with the second direction changer 20B, by use of the second flow controller 70B. Accordingly, it is possible to adjust the amount of flotation of the bare optical fiber 3 in the second direction changer 20B.

According to the manufacturing method, since the amount of fluid is individually controlled in each of the first direction changer 20A and the second direction changer 20B, it is possible to reliably stabilize the flotation position of the bare optical fiber 3.

EXAMPLES

Example 1

The manufacturing apparatus 1A shown in FIG. 1 was prepared. As the first direction changer 20A and the second direction changer 20B, the direction changer 201 shown in FIG. 3 was used.

As shown in FIG. 2, an angle θ1 formed between the inner side surface 21c of the guide groove 21 and the radial direction D1 was 0.5 degrees. The width of the bottom of the guide groove 21 was 50 μm.

A flotation turning radius of the bare optical fiber 3 was approximately 62.5 mm.

Fluid which is to be introduced into the direction changers 20A and 20B is air, and the temperature thereof was at a room temperature (approximately 24° C.).

The introduction flow rate of air into each of the first direction changer 20A and the second direction changer 20B was 100 liters per minute.

The first direction changer 20A was provided at the position at which the temperature of the bare optical fiber 3 becomes approximately 1000° C. The second direction changer 20B was provided at the position away from the first direction changer 20A at 1 m in the downstream side of the fiber drawing direction.

The bare optical fiber 3 (outer diameter of 125 μm) was obtained by drawing the optical fiber from the optical fiber preform 2 in the drawing unit 10. The drawing speed was 30 m/second, and the drawing tension was 150 gf.

The direction of the bare optical fiber 3 that is drawn from the optical fiber preform 2 in the downward vertical direction (first pathway L1) is changed by the first direction changer 20A to be in the horizontal direction (second pathway L2). Subsequently, the direction of the bare optical fiber 3 is changed by the second direction changer 20B to be in the downward vertical direction (third pathway L3).

In the coating unit 30, the bare optical fiber 3 was subjected to a coating step using an ultraviolet curable resin, the UV lamp 40a irradiated the resin with ultraviolet light in the curing unit 40 and thereby a coated layer was cured, and the optical fiber 5 was obtained.

The optical fiber 5 passed through the pulley 80 and the pick-up unit 90 and was wound around the winding unit 100.

The detector 50 output a detection signal to the controller 60 based on the positional information associated with the bare optical fiber 3 in the third pathway L3, and the controller 60 controlled the introduction flow rates of the fluid which are introduced into the first direction changer 20A and the second direction changer 20B based on the detection signal, by use of the first flow controller 70A and the second flow controller 70B. Consequently, the flow velocity of the fluid discharged from the outlet nozzle 22 to the guide groove 21 was controlled in the first direction changer 20A and the second direction changer 20B. As a control method, PID control was used.

Particularly, the center value of the flotation turning radius of the bare optical fiber 3 (for example, shown in FIGS. 3 and 4) was 62.5 mm. The control was carried out such that: in the case where the flotation turning radius decreases less than the center value, the introduction flow rates of the fluid which are introduced into the first direction changer 20A and the second direction changer 20B increase; in the case where the flotation turning radius increases more than the center value, the introduction flow rates of the fluid which are introduced into the first direction changer 20A and the second direction changer 20B decrease.

The optical fiber 5 of 10000 km was manufactured by the above-described manufacturing method. In the manufacture of the optical fiber 5, a drawing velocity of the optical fiber 5 was 30±1 m/second, and a drawing tension was 150±25 gf.

Moreover, since the flotation turning radius of the bare optical fiber 3 in the first direction changer 20A and the second direction changer 20B was 62.5±0.05 mm, the flotation of the bare optical fiber 3 was stabilized.

After the optical fiber 5 is manufactured by the manufacturing method, a proof test was carried out with respect to the optical fiber. As a result, it was determined that the optical fiber 5 can be manufactured with a high level of yield without damage to the bare optical fiber 3 by use of the first direction changer 20A and the second direction changer 20B.

Example 2

The manufacturing apparatus 1B shown in FIG. 6 was prepared.

A drawing tension of the optical fiber 5 was measured by use of a load sensor (not shown in the figure) provided on the pulley 80, and a measurement signal is output to the controller 160 based on the measurement value. The controller 160 controlled the introduction flow rates of the fluid which are introduced into the first direction changer 20A and the second direction changer 20B by use of the first flow controller 70A and the second flow controller 70B based on the measurement signal. As a control method, proportional control was adopted. In this Example, the optical fiber 5 was manufactured under the control condition described above, and the condition other than the above-described condition was the same as that of Example 1.

The specific control method is as follows.

Firstly, data associated with the amount of fluid which causes the amount of flotation of the bare optical fiber 3 to be constant was previously obtained for each drawing tension.

The introduction flow rates of the fluid which are introduced into the first direction changer 20A and the second direction changer 20B when the flotation turning radius of the bare optical fiber 3 is 62.5 mm at the drawing tension of 125 gf was 75 L/min. The introduction flow rates of the fluid when the flotation turning radius of the bare optical fiber 3 is 62.5 mm at the drawing tension of 175 gf was 125 L/min.

Based on the results, regarding the first direction changer 20A and the second direction changer 20B, a proportionality factor of 1 L/min/gf was set thereto, and the fluid introduction flow rates were each controlled therein. Particularly, the fluid introduction flow rate was controlled to be 100/min by the controller in the case where the drawing tension is 150 gf. Furthermore, the control was carried out so that the fluid introduction flow rate varies at ±1 L/min when the drawing tension varies at ±1 gf. Specifically, the control was carried out so that: when the drawing tension increases at 1 gf, the fluid introduction flow rate increases at 1 L/min; and when the drawing tension is reduced at 1 gf, the fluid introduction flow rate is reduced at 1 L/min.

The optical fiber 5 of 10000 km was manufactured by the above-described manufacturing method. In the manufacture of the optical fiber 5, a drawing velocity of the optical fiber 5 was 30±1 m/second, and a drawing tension was 150±25 gf.

Moreover, the flotation of the bare optical fiber 3 in the first direction changer 20A and the second direction changer 20B was stabilized.

After the optical fiber 5 is manufactured by the manufacturing method, a proof test was carried out with respect to the optical fiber. As a result, it was determined that the optical fiber 5 can be manufactured with a high level of yield without damage to the bare optical fiber 3 by use of the first direction changer 20A and the second direction changer 20B.

Comparative Example 1

In this Comparative Example, an optical fiber 5 of 10000 km was manufactured under the same condition as that of Example 1 except that the fluid introduction flow rates which are introduced into the first direction changer 20A and the second direction changer 20B are set as a constant value, that is, 100 L/min.

In the manufacture of an optical fiber 5, a drawing velocity of the optical fiber 5 was 30±1 m/second, and a drawing tension was 150±25 gf; however, variations in the amounts of flotation of the bare optical fiber 3 in the first direction changer 20A and the second direction changer 20B were large.

After the optical fiber 5 is manufactured by the manufacturing method, a proof test was carried out with respect to the optical fiber. As a result, it was determined that the wire breakage occurs, it is thought that contact of the bare optical fiber 3 into an inner side surface of the guide groove causes the wire breakage, and the Comparative Example does not contribute to a high level of yield in manufacture of the optical fiber.

In the above-description, a method of manufacturing an optical fiber of the invention and an optical fiber manufacturing apparatus thereof are described; however, the technical scope of the invention is not limited to the above embodiments, and various modifications may be made without departing from the scope of the invention.

For example, the number of direction changers used in the method of manufacturing the optical fiber according to the embodiment of the invention may be one or more. Each of the manufacturing apparatus 1A and 1B shown in FIGS. 1 and 6 uses two direction changers 20; however, the number of direction changers 20 may be 1 or an arbitrary number, for example, 3 or more.

What is claimed is:

1. A control apparatus comprising:
one or more direction changers that change a direction of a bare optical fiber at a position between a drawer and a coater of an optical fiber manufacturing apparatus, each direction changer comprising a guide groove, an internal space into which fluid is introduced from an outside, and an outlet nozzle, the guide groove being configured to guide the bare optical fiber, the outlet nozzle being formed in the guide groove and being configured to blow off the fluid from the internal space and thereby cause the bare optical fiber to float inside the guide groove;
a detector that detects a position of the bare optical fiber in at least one direction changer of the one or more direction changers; and
a controller that controls an introduction flow rate of the fluid into the at least one direction changer based on positional information associated with the bare optical fiber which is measured in the detector, the controller detecting a position of the bare optical fiber in at least one direction changer and thereby controlling the introduction flow rate of the fluid into the at least one direction changer based on the positional information obtained by the detection, wherein
the control apparatus stabilizes a flotation position of the bare optical fiber in the at least one direction changer, and thereby causes a fiber inlet position at which the bare optical fiber enters a coater to be constant.

2. An optical fiber manufacturing apparatus comprising:
a control apparatus according to claim 1;
the drawer that forms the bare optical fiber by drawing the bare optical fiber from an optical fiber preform;
the coater that provides a coated layer made of a resin on a periphery of the bare optical fiber; and
a curer that cures the coated layer.

3. The control apparatus according to claim 1, wherein the detector is located between the at least one direction changer and the coater.

4. The control apparatus according to claim 1, wherein the detector is provided in a downstream side of the at least one direction changer in a fiber drawing direction.

5. The control apparatus according to claim 4, wherein the detector is located at a position apart from the at least one direction changer in the downstream side of the at least one direction changer in the fiber drawing direction.

6. A control apparatus comprising:
one or more direction changers that change a direction of a bare optical fiber at a position between a drawer and a coater of an optical fiber manufacturing apparatus, each direction changer comprising a guide groove, an internal space into which fluid is introduced from an outside, and an outlet nozzle, the guide groove being configured to guide the bare optical fiber, the outlet nozzle being formed in the guide groove and being configured to blow off the fluid from the internal space and thereby cause the bare optical fiber to float inside the guide groove;

a detector that detects a position of the bare optical fiber in at least one direction changer of the one or more direction changers; and a controller that controls an introduction flow rate of the fluid into the at least one direction changer based on positional information associated with the bare optical fiber which is measured in the detector, the controller controlling an introduction flow rate of the fluid into the at least one direction changer based on a relationship between a position of the bare optical fiber in at least one of the direction changers, an introduction flow rate of the fluid into the at least one direction changer, and a drawing tension that is to be applied to the optical fiber, wherein the control apparatus stabilizes a flotation position of the bare optical fiber in the at least one direction changer, and thereby causes a fiber inlet position at which the bare optical fiber enters a coater to be constant.

7. An optical fiber manufacturing apparatus comprising:

a control apparatus according to claim 6;

the drawer that forms the bare optical fiber by drawing the bare optical fiber from an optical fiber preform;

the coater that provides a coated layer made of a resin on a periphery of the bare optical fiber; and a curer that cures the coated layer.

8. The control apparatus according to claim 6, wherein the detector is located between the at least one direction changer and the coater.

9. The control apparatus according to claim 6, wherein the detector is provided in a downstream side of the at least one direction changer in a fiber drawing direction.

10. The control apparatus according to claim 9, wherein the detector is located at a position apart from the at least one direction changer in the downstream side of the at least one direction changer in the fiber drawing direction.

\* \* \* \* \*